United States Patent Office 3,728,278
Patented Apr. 17, 1973

3,728,278
CATIONIC EMULSIONS
Michael C. Tramelli, Great Falls, Mont., assignor to
Phillips Petroleum Company
No Drawing. Filed Apr. 25, 1968, Ser. No. 724,229
Int. Cl. B01j 13/00; C08h 13/00
U.S. Cl. 252—311.5          5 Claims

ABSTRACT OF THE DISCLOSURE

An improved cationic asphalt-in-water emulsion consisting of asphalt, water, a metallic salt, an inorganic acid, and a combination of cationic emulsifying agents which enables emulsions to be prepared which have less asphalt at specification viscosities, thereby reducing the cost of the emulsion.

---

This invention relates to improved cationic emulsions. In another aspect, it relates to cationic asphalt-in-water emulsions which have relatively low viscosities which are required to meet commercial specifications, but which contain less asphalt than was heretobefore possible to obtain for specification cationic emulsions.

In recent years, cationic asphalt-in-water emulsions have found increasing use in road paving applications. These emulsions have been found to possess advantageous properties of stability and adhesion to various types of aggregates. They are usually employed in road-paving operations at ambient temperatures which enables easy handling and application of the emulsion to the aggregate.

However, due to the increasing use of these emulsions, various state and local governmental highway authorities have required that the emulsions be of certain critical specifications. One of the more important of these specifications has been the viscosity of the emulsion which is utilized to pave roads which are under control of these various authorities. Generally, the viscosity is assigned a value such as the Saybolt Furol Viscosity (ASTM D-88-56) which is expressed in seconds. These specifications are usually in the range of from 50 to 400. Hereinafter, in this disclosure the Saybolt Furol Viscosity is referred to as SFV. In the preparation of cationic asphalt-in-water emulsions, the SFV has previously been regulated by the addition of asphalt or water to the emulsion.

In the commercial preparation of these asphalt emulsions, the SFV specifications have presented a problem of cost in the ingredients utilized in the emulsion formulation. The most expensive ingredient in the formulation is the asphalt. Accordingly, it is desirable that an emulsion be prepared which meets the specification requirements, but which uses a minimum amount of the asphalt component.

To further illustrate the problem which is solved by the emulsion of the invention, the following illustration is offered. If the SFV specification requirement for the emulsion is $x$ seconds, wherein $x$ is an integer in the range of from 40–450, it is desirable to produce an emulsion which has a SFV of about $x+5$ seconds to be certain the specification requirement is satisfied. Heretobefore, the emulsifying agent, water, salt, acid and asphalt formulation which comprises the emulsion would be prepared using an amount M of asphalt.

I have discovered that by using a combination of emulsifying agents the amount of asphalt required to impart a SFV of $x+5$ seconds to the emulsion is an amount of about $M-[(.01-.03)M]$. In other words, the amount of asphalt required to meet the specification is reduced by about 1 to 3 percent, which results in a substantial savings in the total cost of the emulsion. The combination of emulsifying agents consists of a primary amine and a diamine in which the primary amine member does not exceed 50 percent of the total weight of the emulsifying agents utilized to form the emulsion. The emulsion of the invention is in every respect satisfactory with respect to the properties of adhesion, coverage, wear resistance, ease of application to the surface, and the like.

Therefore, it is an object of this invention to provide a novel cationic asphalt-in-water emulsion which meets commercial specifications while utilizing less amounts of asphalt than was heretobefore possible to meet these specifications.

Other aspects, objects, and the several advantages of this invention will become apparent from a study of the disclosure and the appended claims.

The cationic emulsifying agents which are employed in accordance with the invention are a combination of surfactants. One member of the combination is a diamine having the following general formula:

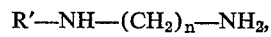

$$R'\text{---}NH\text{---}(CH_2)_n\text{---}NH_2,$$

wherein R' is selected from the group consisting of alkyl, alkenyl, and alkadienyl radicals having in the range of from 12–20 carbon atoms, inclusive, and $n$ is an integer in the range of from 1–3, inclusive. These compounds are also known as fatty amines due to the fact that they are derived from fatty acids. Preferably, mixtures of diamines of the above general formula are utilized; however, it is within the scope of the invention to use a pure diamine alone. Of particular usefulness is a commercially available N-tallow trimethylene diamine.

The second member of the combination of cationic emulsifying agents which is utilized in accordance with the invention is a primary amine having the general formula $R\text{---}NH_2$ wherein R is selected from the group consisting of alkyl, alkenyl and alkadienyl radicals having in the range of from 16–20 carbon atoms per molecule, inclusive. Preferably, mixtures of primary amines of the above general formula are employed; however, it is within the scope of the invention to use a pure primary amine alone. Of particular usefulness is a commercially available mixture consisting of 50–60 percent oleylamine, 35–40 percent stearylamine, and 3–5 percent linoleylamine.

As previously mentioned, the amount of the combination of surfactants utilized in forming the emulsion is in the range of from .05 to 1 percent. However, it has been found that better results are obtained when the combination is used in the range of from 0.1 to 0.5 percent by weight of total emulsion. In addition, it is essential that the primary amine member of the combination be present in the range of 10–50 percent by weight of the combination of surfactants. If the primary amine exceeds 50 percent by weight of the total amount of the combination, an emulsion is not formed at this formulation.

The cationic asphalt-in-water emulsion of the invention is formed utilizing the following proportion of ingredients. The combination of emulsifiers in the range of 0.5 to 1.0 weight percent of total emulsion is added to hot water. The hot water is previously acidified by the addition of an inorganic acid, hereinafter described, which is added to the water in the amounts of about 0.02 to .5 weight percent of the total weight of emulsion. To the hot water and surfactant mixture is added in the range of .01 to .3 weight percent of total emulsion a metallic salt, hereinafter described, which is well known in the art to promote the formation of an emulsion. The resulting mixture, which is known as a soap solution, is then mixed with the heated asphalt and hot water is added to satisfy the total weight of the emulsion. The hot soap solution-asphalt mixture is then passed through a colloid mill to form the emulsion.

The emulsion may then be cooled to room temperature and stored until such time as it is to be utilized in road paving applications.

The asphalt utilized in accordance with the invention may be any well known commercially available asphalt. Of particular usefulness are those asphalts having a penetration at 25° C. of from 60 to 300, preferably 85 to 100. The amount of asphalt utilized in the emulsion will vary over a wide range depending upon the particular SFV which is desired for the resulting emulsion. As previously mentioned, in accordance with the invention the amount of asphalt will usually be in the range of from 1 to 3 percent less than what is required if the combination of emulsifying agents is not utilized to form the emulsion. Obviously, therefore, substantial savings in the cost of the asphalt are realized when using the emulsion of the invention.

The inorganic acids utilized in accordance with the invention are conventionally known and include nitric, sulfuric, acetic, hydrochloric, and sulfonic acids. The metallic salt promoters are selected from the group consisting of calcium, sodium, aluminum, magnesium and lead salts of hydrochloric, nitric, and sulfuric acids. Preferably, hydrochloric acid and calcium chloride are used in the emulsions formed. It has been reported in some of the literature concerning its use with emulsions of the cationic type, that the addition of metallic salts to the emulsion has some effect upon viscosity of the resulting emulsion. However, in my experience with the combination of the surfactants employed according to the invention, the metallic salt has been found only to aid in the promotion of the formation of the emulsion in the colloid mill, and has had no significant effect upon resulting viscosities.

In order that a superior emulsion is formed, it is desirable that a certain procedure be followed in mixing the ingredients. The asphalt emulsion is, therefore, preferably prepared in the following manner.

The water is acidified by the addition of the inorganic acid. Next, the surfactant is added and dissolved in the acid solution. Finally, the metallic salt is added and the mixture heated in the range of from 110 to 150° F. Separately, the asphalt is heated in the range of 190 to 300° F., the exact temperature being dependent upon the temperature of the soap solution in relation to the pressure which will be necessary to maintain the water in the solution in a liquid state during milling. The aqueous soap solution mixture and asphalt are then pre-mixed by conventional stirring apparatus and then the mixture is proportioned to a colloid mill to emulsify the same. The resulting mixture is then cooled to below 150° F. before being transferred to a storage vessel.

A more comprehensive understanding of my invention is more readily available in the following illustrative example which, however, is not intended to limit the scope of the invention.

EXAMPLE

In accordance with the invention, commercial grade asphalt emulsions were prepared, each emulsion being adjusted by the addition of more or less asphalt to give a SFV of 55 seconds. The formulation utilized in each of the four test emulsions is summarized in Table I. The procedure used to form the emulsions was as set forth above. In each run, the asphalt employed was a commercially available asphalt having a penetration at 25° C. of 85 to 100.

Each emulsion formed in the tests was then visually examined to determine smoothness, formation of scum, and the presence of gritty particles. The emulsion was then stored for 24 hours and if the emulsion showed further stability after storage, tests were made for viscosity, residue by evaporation, residue by distillation, percent oil distillate, sieve tests, and particle charge. Tests were also performed on the residue of distillation including density, penetration, ductility, and solubility in carbon tetrachloride. The above tests were made to determine whether the resulting emulsion met specification requirements.

The data in Table I demonstrates that the novel emulsions formed using the combination of surfactants required 2 percent less asphalt than was needed when the diamine member of the combination was used alone as the surfactant. This is shown by comparison of the amount of asphalt needed in Run I to that needed in Run II to reach a SFV of 55 seconds. It can readily be seen, therefore, that the emulsion formed using the combination of emulsifying agents results in a substantial reduction in cost of the emulsion because less asphalt is needed. Runs III and IV demonstrate that it is essential that not more than 50 percent of the combination of surfactants be of primary diamine (R—$NH_2$) member. As shown therein, a greater amount results in no emulsion being formed.

Several batches of the emulsion according to the formula of Run II were prepared to insure reproducibility and the emulsion was within specification requirements. A larger quantity of the emulsion was then prepared, isolated, and observed for storage stability. After 32 days of storage, the emulsion was satisfactorily stable. A portion was then tested in a road paving application test along with the emulsion from Run I. In all respects, the emulsion from Run II showed satisfactory properties of coverage, adhesion, wear resistance, easy application and the like. Therefore, it is seen that the emulsion formed according to the invention does not result in a reduction of desirable properties which have been found to be satisfactory in the cationic asphalt-in-water emulsions employed in road paving operations.

TABLE I

| Chemical | Formulation [1]—All figures are weight percent of total emulsion | | | |
|---|---|---|---|---|
| | Run I | Run II | Run III | Run IV |
| Duomeen-T [2] | .30 | .15 | | .10 |
| Delamin P-80 [3] | | .15 | .30 | .20 |
| HCl | .19 | .19 | .19 | .19 |
| CaCl$_2$ | .05 | .05 | .05 | .05 |
| Water | 30.46 | 32.46 | Variable | Variable |
| Asphalt | 69.00 | 67.00 | ([4]) | ([4]) |

[1] Based on asphalt necessary to reach a Saybolt Furol Viscosity of 55 seconds.
[2] Commercially available from Armour and Co., a tallow trimethylene diamine.
[3] Commercially available from Hercules Powder Company, a mixture of 50–60 percent oleylamine, 35–40 percent stearylamine, and 3–5 percent linoleylamine.
[4] No emulsion was formed.

Various modifications and variations are possible within the scope of this disclosure to those skilled in the art without departing from the spirit and scope thereof.

I claim:

1. An asphalt-in-water emulsion consisting of asphalt having a penetration at 25° C. of from 60 to 300; water; .01 to .3 percent by weight of the total emulsion of a metallic salt which is a calcium, sodium, aluminum, or magnesium salt of hydrochloric, nitric, or sulfuric acid; .02 to 5 percent by weight of total emulsion of an inorganic acid; and .05 to 1 percent by weight of the total emulsion of a combination of cationic emulsifying agents, the first member of said combination having the general formula R—$NH_2$ wherein R is selected from the group consisting of alkyl, alkenyl, and alkadienyl radicals having 16–20 carbon atoms per molecule, and the second member of said combination having the general formula R'—NH—$(CH_2)_n$—$NH_2$ wherein R' is a radical selected from the group consisting of alkyl, alkenyl, and alkadienyl radicals having 12–20 carbon atoms per molecule, and $n$ is an integer from 1–3, inclusive; said first member being present in said combination in the range of from 10–50 percent by weight of said combination, and the amount of asphalt and water being sufficient to provide said asphalt-in-water emulsion with a Saybolt Fural Viscosity of from 40 to 450 seconds.

2. An asphalt-in-water emulsion according to claim 1 wherein said asphalt has a penetration at 25° C. of 185–200.

3. An asphalt-in-water emulsion according to claim 2 wherein said inorganic acid is selected from the group consisting of hydrochloric, nitric, sulfonic, sulfuric and acetic acids.

4. An asphalt-in-water emulsion according to claim 3 wherein said metallic salt is calcium chloride, said acid is hydrochloric acid, said first member of said combination consisting essentially of 50–60 percent oleylamine, 35–40 percent stearylamine, and 3–5 percent linoleylamine; and said second member of said combination is N-tallow trimethyl diamine.

5. A cationic asphalt-in-water emulsion according to claim 4 wherein said calcium chloride is present in the amount of .05 percent by weight of total emulsion, said hydrochloric acid is present in the amount of .20 percent by weight of the total weight of emulsion, said first member of said combination is present in the amount of .15 part by weight of the total weight of emulsion, said second member is present in the amount of .15 part by weight per total weight of emulsion, and said asphalt is present in the amount of 67 percent by weight of the total weight of emulsion, the resulting emulsion having a Saybolt Furol Viscosity of 55 seconds.

References Cited
UNITED STATES PATENTS

| | | | |
|---|---|---|---|
| 2,886,458 | 5/1959 | Ceintrey | 106—277 |
| 3,236,671 | 2/1966 | Dybalski et al. | 106—277 |

JOHN D. WELSH, Primary Examiner

U.S. Cl. X.R.

106—277